United States Patent [19]

Haarmann

[11] Patent Number: 4,484,899

[45] Date of Patent: Nov. 27, 1984

[54] COUPLING FOR ACCOMMODATING MISALIGNMENT BETWEEN SHAFTS

[75] Inventor: Walter Haarmann, Wolfenbüttel, Fed. Rep. of Germany

[73] Assignee: Schmidt Couplings, Incorporated, Hamilton, Ohio

[21] Appl. No.: 450,321

[22] Filed: Dec. 16, 1982

[30] Foreign Application Priority Data

Dec. 24, 1981 [DE] Fed. Rep. of Germany ....... 3151401

[51] Int. Cl.³ .......................... F16D 3/70; F16D 3/04; F16D 3/60
[52] U.S. Cl. ..................................... 464/69; 464/102; 464/137
[58] Field of Search .................. 464/69, 102, 103, 104, 464/105, 81, 137, 138, 147, 51

[56] References Cited

U.S. PATENT DOCUMENTS

| | | | |
|---|---|---|---|
| 903,171 | 11/1908 | Callan | 464/137 X |
| 1,832,300 | 11/1931 | Griswold | 464/137 X |
| 3,791,170 | 2/1974 | Schmidt | 464/69 |
| 4,125,028 | 11/1978 | Gordon | 464/69 X |

FOREIGN PATENT DOCUMENTS 856273  6/1940  France ................................. 464/69

Primary Examiner—Stuart S. Levy
Assistant Examiner—Thomas R. Hannon
Attorney, Agent, or Firm—Milton E. Gilbert; Gary E. Ross

[57] ABSTRACT

In a coupling operating on the principle of the Oldham coupling, parallel drives are disposed orthogonally relative to one another and include pairs of guide rods. In order to reduce the axial measurements of such a coupling, the guide rods are disposed in recesses located in the intermediate member. This permits the guide rods to be located, according to one embodiment of the invention, in a single plane.

23 Claims, 9 Drawing Figures

COUPLING FOR ACCOMMODATING MISALIGNMENT BETWEEN SHAFTS

The invention relates to couplings and more particularly to couplings for connecting rotary shafts which are capable of accommodating misalignment of the shafts.

Specifically, the invention pertains to a coupling of the type comprising a first outer rotary member connectible to a first shaft; a floating intermediate member; a first pair of parallel guide rods disposed diametrically opposite each other between the first rotary member and the intermediate member, each connected at one of its ends to the first rotary member and at the other of its ends to the intermediate member and forming a first parallel guide drive; a second outer rotary member connectable to a second shaft; and a second pair of parallel guide rods disposed diametrically opposite each other, at 90° relative to the first pair and between the intermediate member and the second rotary member, each connected at one of its ends to the intermediate member and at the other of its ends to the second rotary member and forming a second parallel guide drive. Such a coupling is taught in U.S. Pat. No. 3,791,170 issued on Feb. 12, 1974.

Such conventional couplings are widely known. They operate on the principle of an Oldham coupling. A classic Oldham coupling has a disk as its first rotary member, an intermediate member likewise made in the form of a disk and another disk as a second rotary member. The first rotary member is connected with the intermediate member by a groove-and-tongue joint. The second rotary member is, in turn, connected with the intermediate member by a groove-and-tongue joint perpendicularly to the first. Such a coupling permits the orthogonic transmission of a rotary motion whereby the intermediate member of the coupling acquires pure rotary motion when the shaft is not misaligned. In the coupling as here described, the groove-and-tongue joints are replaced with parallel guide drives which effect a parallel driving of the intermediate member on one rotary member and, perpendicularly to it, a parallel driving of the other rotary member on the intermediate member.

Such conventional couplings are relatively easy to manufacture and are especially suitable for the accommodation of relatively small misalignments. However, the axial extent of these couplings can limit its use in particular applications. Further, difficulties can arise in the assembly and disassembly of the parts of the coupling due to operational wear as well as damage caused by the assembly and disassembly process itself. Further, the misalignment can cause unbalanced forces to be imposed on the guide rods which, for example, can result in reduced life expectancy and require a periodic checking and possibly repair or replacement of the bearings.

An object of the present invention is to provide an improved coupling generally of the type described above but having a reduced size in the axial direction.

A further object of the invention is to provide a coupling which can be economically manufactured and repaired.

A yet further object of the invention is to provide a coupling more easily assembled and disassembled with reduced likelihood of damage relating therefrom.

A still further object of the present invention is to provide a coupling in which the various forces and torques realized by the coupling during rotation and misalignment of the shafts are less likely to cause damage to the coupling components.

These and other objects of the invention are met by a coupling of the type described hereinabove in which the guide rods are disposed in recesses located in the intermediate member. Preferably, the recesses are disposed in pairs on opposing faces of the intermediate member and in substantially diametrically-opposed arrangement, each staggered at 90° relative to associated recesses on the other face. Bearing pins which maintain the guide-rods on the associated rotary members and the intermediate element are, according to a further aspect of the invention, screwed into position so as to provide facilitated assembly and disassembly.

According to another embodiment of the invention, the guide-rods are disposed in a common plane.

In a further embodiment of the invention, the rotary members include axial projections that project into the recesses of the intermediate member on which the guide rods are articulated. The intermediate member includes on its circumference pairs of bearing lugs between which the guide rods are supported bilaterally, and continuous notches in which the guide rods are mobile and into which the bearing pins of the rotary members project.

The invention may best be understood with reference to the accompanying drawings wherein illustrative embodiments are shown.

Figure 1:
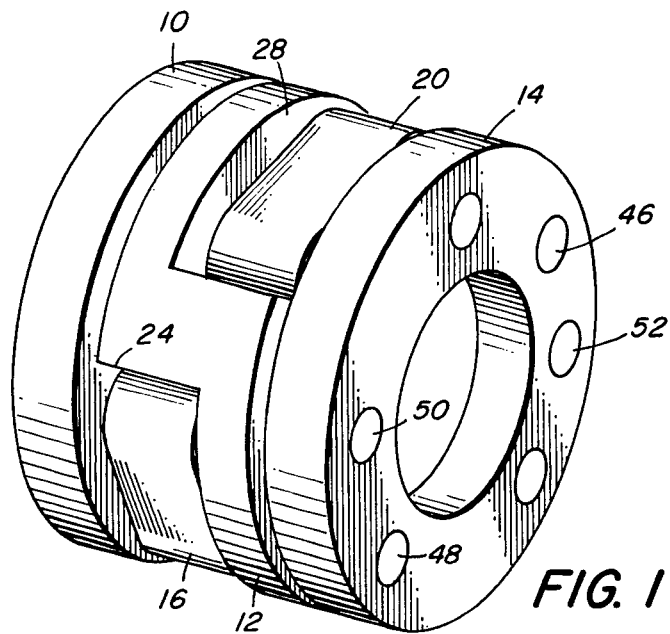
FIG. 1 is a perspective view of a coupling embodying the principles of the present invention.
Figure 2:
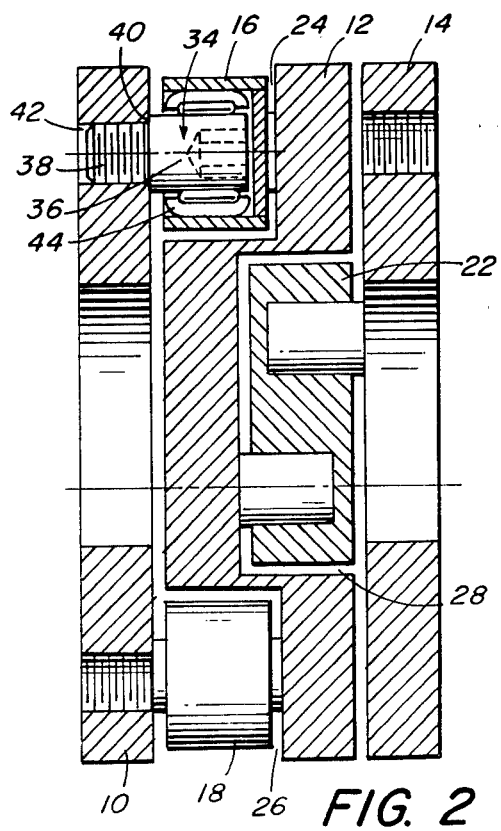
FIG. 2 is a longitudinal sectional view of the coupling of FIG. 1.

Referring now more particularly to the drawings, there is shown in FIGS. 1 and 2 thereof a coupling comprising a first outer rotary member 10 connectable to a first shaft (not shown), a floating intermediate member 12 and a second outer rotary member 14 connectible to a second shaft (not shown). Between the first rotary member 10 and the intermediary member 12 there is provided a first pair of parallel guide links or rods 16, 18. The guide rods 16, 18 are arranged diametrically opposite one another and are each articulated, at one end, on the first outer rotary member 10 and, at the other end, on the intermediate member 12. They thus form a parallel guide-drive through which the intermediate member is always driven parallel to the first rotary member 10. When the first rotary member 10 rotates, it drives the intermediate member 12 orthogonically relative thereto.

A second pair of parallel guide links or rods 20, 22 disposed diametrically opposite each other and at a 90° angle to the first pair 16, 18, is provided between the intermediary member 12 and the second rotary member 14. They are articulated at one of their ends to the intermediate member 12 and, at the other of their end, to the second rotary member 14. This way, they form a parallel guide drive through which the second rotary member 14 is driven parallel to the intermediate member 12 in a direction perpendicular to that of the parallel drive of the first pair 16, 18 which drives the intermediate member 12 on the first rotary member 10. Through this parallel drive of the second pair 16, 18 the second rotary member 14 is kept in a consistent orientation relative to the intermediary member 12 and is driven orthogonically relative thereto when the intermediary member 12 rotates.

The two parallel drives consequently form an orthogonic coupling of the intermediary member 12 between the first rotary member 10 and the second rotary member 14 even in case of misalignment of the shafts, whereby when the shafts are misaligned, there occurs an oscillating swinging motion of the guide-rods 16, 18 and 20, 22 and a rotating motion of the intermediate member 12. These motions are, however, non-critical in the case of the accommodation of slight misalignments and/or low rpms.

Figure 3:
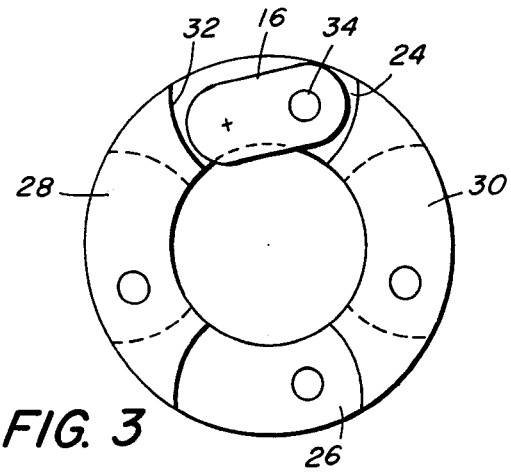
FIG. 3 is an axial view of the intermediate member of the coupling of FIG. 1.

In accordance with the invention, the intermediate member 12 shown in FIGS. 1 and 2 and axially in FIG. 3 has on opposite faces first and second pairs of recesses 24, 26 and 28, 30, respectively, of substantially the same diameter. The recesses 24, 26 on one of the faces are located at a 90° angle to the recesses 28, 30 on the other face. The guide rods 16, 18 and 20, 22 are taken up, respectively, in the recesses 24, 26 and 28, 30 at a distance from the walls 32 of the recesses that permits the aforesaid motion of the guide rods.

Through this construction, the coupling can be scaled down in its axial measurements in comparison to heretofore known constructions. For reasons of stability and for the secure holding of the bearing pins as shall hereinafter be described, the intermediate member must be of a certain thickness. The same applies to the guide rods. In the prior art coupling having the disk-shaped intermediate member with pairs of guide rods disposed on both sides thereof on its faces, the overall depth of the guide rods and intermediate member is the thickness of the intermediate member plus twice the thickness of one guide rod. In accordance with the invention herein, the overall depth of the guide rods and intermediate member can be reduced to more or less the necessary thickness of the intermediate member plus one times the thickness of one guide rod.

As appears from FIG. 2, the guide rods 16, 18, 20 and 22 are articulated on the rotary members 10 and 14 and the intermediate member 12 by means of bearing pins 34 (of which one is shown in detail in FIG. 2), preferably screwed in the rotary members 10, 14 and the intermediate member 12. The bearing pin 34 includes a plain cylindrical section 36 and a threaded portion 38 with a shoulder 40 formed between the cylindrical section 36 and the threaded portion 38. The threaded portion 38 is screwed into a tapped hole 42 in, for example, the first rotary member 10, until the shoulder 40 is level with the face of the first rotary member 10. The guide rods 16, 18, 20, and 22 are located on the bearing pin 34 over bearing 44, preferably a needle bearing, whereby the bearing 44 is substantially on the same plane as the guide rods.

In conventional couplings of this type not improved by the subject invention, the bearing pins are parts subject to wear. Typically, the bearing pins are pressed into the rotary members and such arrangements are difficult in assembly and disassembly. For example, in disassembly, the seat for the bearing pin can be readily damaged. Therefore, its bore must at times be remachined and a new bearing pin of a larger size installed.

These difficulties are avoided by the use of screwed-in pins 34. The bore 42 can be used again and again even with repeated disassembly, and the pins 34 can be easily replaced with their replacement being relatively inexpensive.

Figure 4:
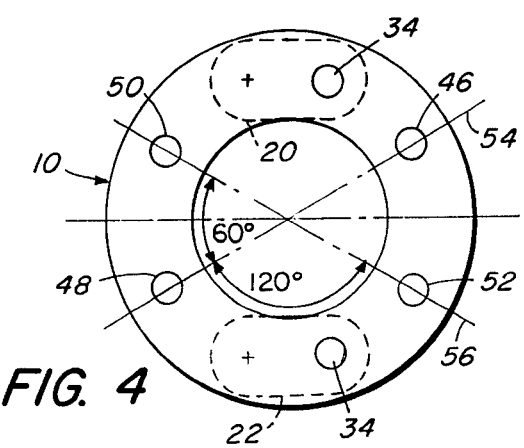
FIG. 4 is an axial view of an outer rotary member of the coupling of FIG. 1.

The rotary members 10, 14 are disk-shaped and are identical parts, turned at 90° relative to each other in the assembled coupling. A preferred embodiment of the rotary member is represented in FIG. 4. While the first rotary member 10 is illustrated, it should be understood that the other is similarly constructed.

Each rotary member 10, 14 exhibits two pairs of diametrically opposed through-bores 46, 48 and 50, 52 (shown in FIGS. 1 and 4) by means of which the rotary members 10 or 14 can be connected with a respective shaft flange or the like (not shown). The through-bores 46, 48 and 50, 52 are circumferentially spaced about the rotary member 10, preferably so as to lie on respective diameters which form an acute angle of 60° and an obtuse angle of 120° (as shown in FIG. 4). In the obtuse angle are located the bearing pins 34 for the guide rods.

In conventional couplings of this type not improved by the subject invention, the disposition of the through-bores 46, 48 and 50, 52 is such that there is at least one bore axially covered by a guide rod at all times. The preferred arrangement described herein avoids that.

It shall be understood without further illustration that other arrangements and numbers of through-bores are contemplated by the invention. For example, in small couplings there need be provided only two through-bores at a 180° angle, instead of the two pairs 46, 48 and 50, 52 of FIG. 4, which would preferably be located on the horizontal diameter of FIG. 4. Alternatively, for example, there can also be provided (especially in larger couplings) more than two pairs of through-bores.

Figure 5:
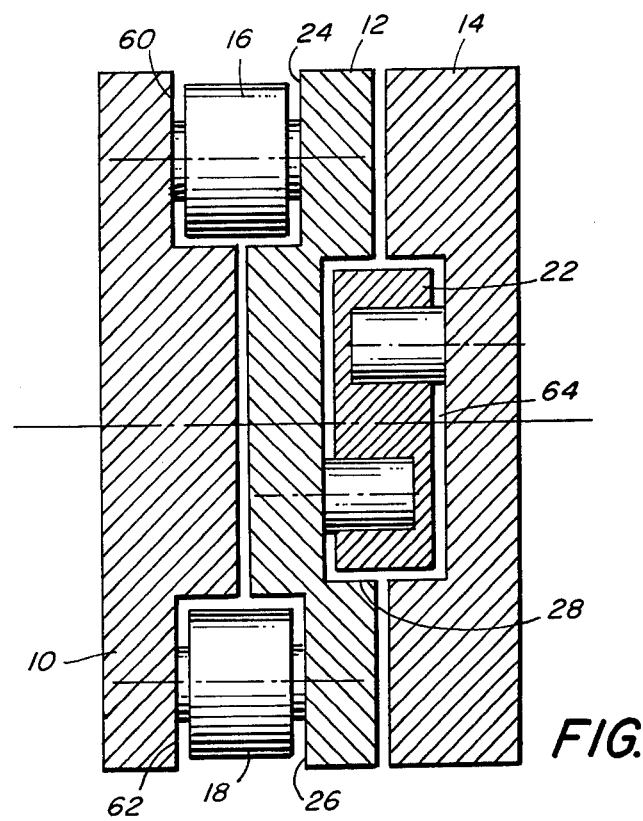
FIG. 5 shows a further embodiment of the invention in which both of the couplings' outer rotary members have recesses receiving the guide rods.

A further embodiment is shown in FIG. 5 which is similar in overall concept of construction to that in FIG. 2. The corresponding features are designated by the same reference numbers. In the embodiment of FIG. 5, the rotary members 10 and 14 also have pairs of diametrically opposed axial recesses 60, 62 and 64 (and one not shown recess 66 diametrically opposite recess 64) on their faces adjoining the intermediate member 12 of the coupling. The guide rods 16, 18, 20, and 22 extend partly in the associated recesses 60, 62, 64 and 66 and, in a similar way, in associated recesses 24, 26, 38, and 30 (30 being not shown) of the intermediate member 12. Here, too, the distance between the guide rods 16, 18 and 20, 22 and the walls of the recesses 60, 62, 64 and 66 is such that the compensating motion of the guide rods is not impeded.

Figure 6:
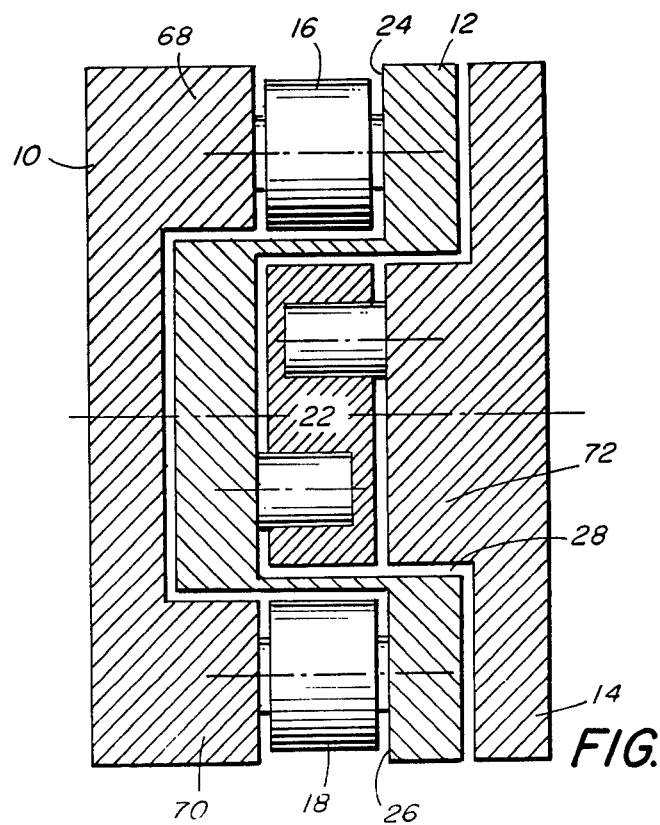
FIG. 6 shows yet a further embodiment of the invention in which recesses in the intermediate member overlap in such a way that all the guide rods are in one plane.

FIG. 6 shows yet a further embodiment of the invention which is similar in overall concept to that of FIG. 2 and 5. Here, too, the corresponding features are designated with the same reference numbers.

In the embodiment of FIG. 6, the recesses 24, 26 on the one hand and 28, 30 (30 being not shown) on the other hand, overlap in such a way that all guide rods 16, 18, 20 and 22 (20 being not shown) of the parallel drive are in the same plane. This avoids pull-out torque on the intermediate member 12 of the coupling. The rotary members 10 and 14 further include axial projections 68, 70 and 72 (and one projection 73 not shown in FIG. 6, projecting diametrically opposite projection 72) which extend into the recesses 24, 26 and 28, 30, respectively of the intermediate member 12 and on which the guide rods 16, 18 and 20, 22 are articulated. In the area of the projections 68, 70, 72 and 73 the rotary members 10, 14 are thick enough to securely hold the bearing pins 34. In the other areas, the rotary members 10, 14 may be of thinner construction.

Figure 7:
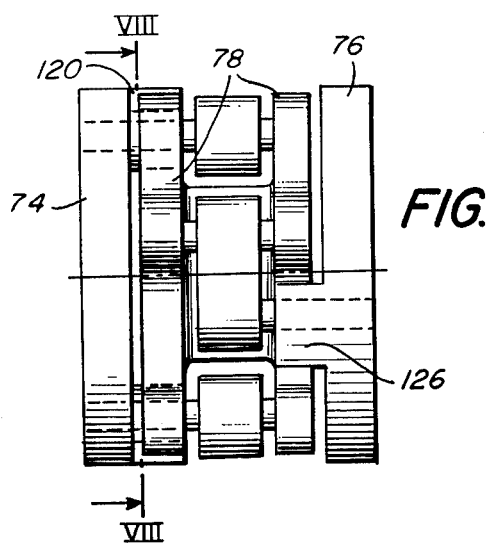
FIG. 7 is a side view of an embodiment of the invention in which all guide rods are in one plane and located bilaterally.
Figure 8:
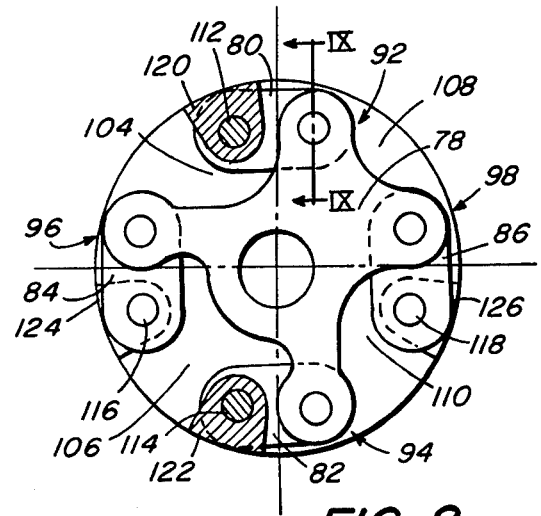
FIG. 8 is a sectional view taken along line VIII—VIII of FIG. 7.
Figure 9:
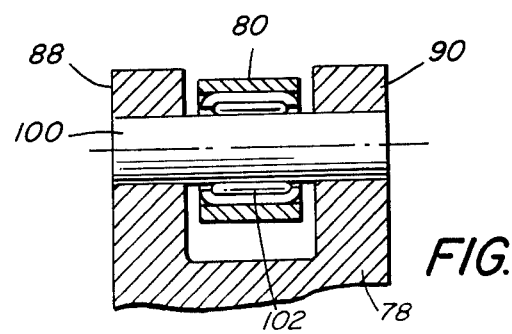
FIG. 9 is a sectional view taken along line IX—IX of FIG. 8.

Generally referring to the embodiment of FIGS. 7 through 9, the guide rods are located on both sides of the intermediate member of the coupling. This fastening of the bearing pins provides less stress on the seats of the bearing pins in the intermediate member. It therefore permits use of a lighter material, e.g. aluminum instead of steel. Also, this minimizes the effects of the unbalanced forces which result in the case of misalignment of the shafts.

With reference specifically to FIGS. 7 and 8, one rotary member, designated by 74, is coupled with a second rotary member 76 by an intermediate member 78 orthogonically oriented. The intermediate member 78 is connected with the first rotary member 74 over a parallel drive with guide rods 80 and 82. The intermediate member 78 is connected with the second rotary member 76 over a parallel drive with guide rods 84 and 86. The guide rods 84 and 86 thus extend perpendicularly to the guide rods 80 and 82. The transmission of the rotary motion from one rotary member to the other, and the compensation of misalignments, occurs in a manner similar to that in the above-described embodiments.

In the embodiment of FIGS. 7 through 9, the intermediate member 78 includes on its circumference pairs of bearing lugs 88, 90 (FIG. 9). These pairs of bearing lugs are designated in FIG. 8 by 92, 94, 96 and 98. As can be seen in FIG. 9, the bearing lugs 88 and 90 extend at a distance parallel to each other in spaced-apart relation. Between them extends a pressed-in pin 100. The guide rods 80, 82, 84, and 86 of both parallel drives are located on pins 100 over bearings 102.

It should be understood that, though not shown, the intermediate member 78 can include two disk-like parts which are connected only by pressed-in pins.

As can be best seen in FIG. 8, the intermediate member 78 comprises on its circumference continuous notches 104, 106, 108 and 110 on which the guide rods 80, 82, 84 and 86 move and in which the bearing pins 112, 114, 116 and 118 of the rotary members 74 and 76 extend. In order to ensure the safe maintaining of the bearing pins 112, 114, 116 and 118 with a minimum material thickness of the rotary members 74, 76 there are also provided axial projections 120, 122, 124 and 126 on the rotary members 74, 76 which extend into the notches 104, 106, 108 and 110 of the intermediate member 78 after assembly.

The axial projections 122 and 124 are disposed circumferentially adjacent to one another such that the guide rods 82 and 84 extend from lugs 94 and 96 on the intermediate member 78 towards each other, while the guide rods 80 and 86 are directed away from each other. This results in the form of the intermediate member of the coupling that can be seen in FIG. 8 with two pairs 92 and 98 of bearing lugs close to each other and two pairs 94 and 96 at a greater distance from each other.

It thus will be seen that the objects of this invention have been fully and effectively accomplished. It will be realized, however, that the foregoing preferred specific embodiments have been shown for the purpose of illustrating the functional and structural principles of this invention and is subject to change without departure from such principles. Therefore, this invention includes all modifications encompassed within the spirit and scope of the following claims.

What is claimed is:

1. A coupling for connecting and accommodating misalignment between rotary shafts, comprising:
   (a) a first rotary member connectable to a first shaft;
   (b) a floating disk-shaped intermediate element having a pair of first portions, and a pair of second portions circumferentially intermediate said first portions and being of greater axial depth than the first portions;
   (c) a first pair of parallel guide rods diametrically opposed between the first rotary member and the intermediate member and articulated at one end on the first rotary member and, at the other end, on the intermediate member to form a parallel drive;
   (d) a second rotary member connectable to a second shaft; and
   (e) a second pair of parallel guide rods diametrically opposed at a 90° angle to the first pair between the intermediate member and the second rotary member, articulated at one end on the intermediate member and at the other end on the second rotary member to form a parallel drive;
   (f) wherein said first and second portions define first and second pairs of recesses on faces opposing said first and second rotary members; said first pair of guide rods at least partially axially disposed within said first pairs of recesses and said second pair of guide rods substantially disposed within said second pair of recesses.

2. The coupling in accordance with claim 1, wherein:
   (a) the intermediate member includes a pair of said recesses in each of the opposing faces thereof, in substantially the same diametrical arrangement;
   (b) said recesses being staggered on one of the faces at 90° relative to the recesses of the other face; and
   (c) the guide rods being disposed partly within said recesses.

3. The coupling in accordance with claim 2 wherein the guide rods are articulated on the intermediate member by means of bearing pins each having a cylindrical section and a threaded portion said bearing pins being screwed into the rotary members and the first portions of the intermediate member.

4. The coupling in accordance with claim 3 wherein the guide rods are supported on the bearing pins by needle bearings.

5. The coupling in accordance with claim 2 wherein the combined axial depth of the intermediate member and the guide rods is substantially equal to the axial depth of the second portions plus that of one guide rod.

6. The coupling in accordance with claim 5 wherein:
   (a) the rotary members are identical assembly parts staggered at 90° relative to one another in the assembled coupling; and
   (b) each rotary member includes two pairs of diametrically opposed through-bores by means of which a shaft flange can be attached to the rotary members, said through bores being circumferentially spaced so as to lie on respective diameters which form an acute angle of 60° and an obtuse angle of 120°, with the bearing pins connecting the guide rods to the rotary members disposed in the holes defining the obtuse angle.

7. The coupling in accordance with claim 1 characterized in that both rotary members include axially extending recesses into which the guide rods partly project.

8. The coupling in accordance with claim 1 characterized in that both pairs of guide rods lie in a common plane.

9. The coupling in accordance with claim 8 wherein the rotary members include axial projections that project into the recesses of the intermediate member on which the guide rods are articulated.

10. The coupling in accordance with claim 8 wherein:
(a) the intermediate member includes on its circumference pairs of bearing lugs between which the guide rods are supported bilaterally, and
(b) the intermediate member further includes on its circumference continuous notches in which the guide rods can move and into which the bearing pins of the rotary members project.

11. The coupling in accordance with claim 10 wherein the intermediate member includes two disk portions connected to each other rigidly by pins.

12. The coupling in accordance with claim 11 wherein the guide rods are supported on the pins.

13. The coupling in accordance with claim 8 wherein:
(a) the rotary members are identical assembly parts oriented in the assembled coupling at 90° relative to each other; and
(b) in each rotary member, in the area between the pins, there are two diametrically opposed through-bores for receiving a shaft flange.

14. The coupling in accordance with claim 1 wherein the intermediate member has on its faces opposing said first and second members a step defined between said first and second portions, and wherein each of the faces of the intermediate member opposing the rotary members comprises a plurality of substantially co-planar first surfaces, and a plurality of substantially co-planar second surfaces connected by said step to said first surfaces.

15. The coupling in accordance with claim 14 wherein the plane defined by the first surfaces is substantially parallel to and spaced axially from the plane defined by the second surfaces.

16. The coupling in accordance with claim 15 wherein the guide rods are articulated to and are disposed adjacent to said first surfaces.

17. The coupling in accordance with claim 1 wherein the rotary members each have a pair of first portions and a pair of second portions circumferentially intermediate the first portions, each of the first and second portions having a face opposing the intermediate member, said first portions faces being axially spaced at a greater distance from the intermediate member than said second portions faces so as to define recesses in said rotary members, said guide rods at least partially axially disposed within said recesses of said rotary members.

18. The coupling in accordance with claim 17 wherein the guide rods articulate to the rotary members are articulated to and disposed adjacent to the faces of the first portions of the rotary members.

19. The coupling in accordance with claim 17 wherein at least a portion of the intermediate member is disposed within the recesses of said rotary members.

20. The coupling in accordance with claim 19 wherein the first and second pairs of guide rods are in the same plane whereby pull-out torque on the intermediate member is avoided.

21. The coupling in accordance with claim 1 wherein each rotary member includes a plurality of projections extending from its surface opposing the intermediate member axially towards the intermediate member and wherein the guide rods are articulated to the projections.

22. The coupling in accordance with claim 1 wherein each rotary member includes lugs disposed in spaced parallel relation with the guide rods disposed between and articulated to the lugs.

23. The coupling in accordance with claim 1 wherein the rotary members and the intermediate members are each disk shaped of approximately equal diameter.

* * * * *